(12) United States Patent
Rizk et al.

(10) Patent No.: US 10,178,336 B2
(45) Date of Patent: Jan. 8, 2019

(54) FLEXIBLE READOUT AND SIGNAL PROCESSING IN A COMPUTATIONAL SENSOR ARRAY

(71) Applicant: The Johns Hopkins University, Baltimore, MD (US)

(72) Inventors: Charbel G. Rizk, Sykesville, MD (US); Philippe O. Pouliquen, Baltimore, MD (US); Andreas G. Andreou, Baltimore, MD (US); Joseph H. Lin, Lowell, MA (US)

(73) Assignee: The Johns Hopkins University, Baltimore, MD (US)

( * ) Notice: Subject to any disclaimer, the term of this patent is extended or adjusted under 35 U.S.C. 154(b) by 35 days.

(21) Appl. No.: 15/635,262

(22) Filed: Jun. 28, 2017

(65) Prior Publication Data
US 2017/0295337 A1    Oct. 12, 2017

Related U.S. Application Data

(62) Division of application No. 14/923,784, filed on Oct. 27, 2015, now Pat. No. 9,723,240, which is a division
(Continued)

(51) Int. Cl.
*H04N 5/378*    (2011.01)
*G01J 1/44*    (2006.01)
(Continued)

(52) U.S. Cl.
CPC ............... *H04N 5/378* (2013.01); *G01J 1/44* (2013.01); *H04N 5/357* (2013.01); *H04N 5/369* (2013.01);
(Continued)

(58) Field of Classification Search
CPC ........ H04N 5/378; H04N 5/374; H04N 5/357; H04N 5/369; H04N 5/37455; H04N 5/3651; G01J 1/44
See application file for complete search history.

(56) References Cited

U.S. PATENT DOCUMENTS 5,449,907 A   9/1995   McKeeman et al.
5,461,425 A   10/1995  Fowler et al.
(Continued)

OTHER PUBLICATIONS

C. G. Rizk, et al., "Flexible Readout and Integration Sensor (FRIS): New Class of Imaging Sensor Arrays Optimized for Air and Missile Defense," Johns Hopkins APL Technical Digest, vol. 28, No. 3, pp. 252-253, Feb. 2010.
(Continued)

*Primary Examiner* — Tony Ko
(74) *Attorney, Agent, or Firm* — Noah J. Hayward

(57) ABSTRACT

A computational sensing array includes an array of sensing elements. In each sensing element, a first signal is generated from a transducer. A second signal is produced by a collection unit in response to receiving the first signal. The second signal may be modified, in a conditioning unit. A sensing element preprocessing unit generates a word representing the value of the modified second signal, and may produce an indication of change of the first signal. A current value of the word may be stored in a state holding element local to the sensing element, and a previous value of the word may be retained in a further state holding element local to the sensing element.

9 Claims, 10 Drawing Sheets

Related U.S. Application Data of application No. 13/671,146, filed on Nov. 7, 2012, now Pat. No. 9,200,954.

(60) Provisional application No. 61/556,616, filed on Nov. 7, 2011, provisional application No. 61/556,612, filed on Nov. 7, 2011.

(51) Int. Cl.
| | | |
|---|---|---|
| *H04N 5/365* | (2011.01) | |
| *H04N 5/3745* | (2011.01) | |
| *H04N 5/369* | (2011.01) | |
| *H04N 5/357* | (2011.01) | |
| *H04N 5/374* | (2011.01) | |

(52) U.S. Cl.
CPC ......... *H04N 5/3651* (2013.01); *H04N 5/374* (2013.01); *H04N 5/379* (2018.08); *H04N 5/37455* (2013.01)

(56) References Cited

U.S. PATENT DOCUMENTS

| | | | |
|---|---|---|---|
| 5,619,426 | A | 4/1997 | Hutchens et al. |
| 5,886,659 | A * | 3/1999 | Pain ............ H04N 3/155 341/144 |
| 6,069,351 | A | 5/2000 | MacK |
| 6,580,454 | B1 | 6/2003 | Perner et al. |
| 6,721,008 | B2 | 4/2004 | Lee et al. |
| 6,922,210 | B2 | 7/2005 | Yang et al. |
| 6,927,433 | B2 | 8/2005 | Hynecek |
| 6,975,356 | B1 | 12/2005 | Miyamoto |
| 6,977,685 | B1 | 12/2005 | Acosta-Serafini et al. |
| 7,023,369 | B2 | 4/2006 | Bocko et al. |
| 7,145,124 | B2 | 12/2006 | Garrood et al. |
| 7,176,970 | B2 | 2/2007 | Lee et al. |
| 7,535,502 | B2 | 5/2009 | Rambaldi et al. |
| 7,701,499 | B2 | 4/2010 | Barnea et al. |
| 7,750,958 | B1 | 7/2010 | Dierickx |
| 7,786,911 | B2 | 8/2010 | Joshi et al. |
| 7,847,846 | B1 | 12/2010 | Ignjatovic et al. |
| 7,920,193 | B2 | 4/2011 | Ladd et al. |
| 8,144,223 | B2 | 3/2012 | Van Blerkom et al. |
| 8,164,665 | B2 | 4/2012 | Neter |
| 2002/0050518 | A1 | 5/2002 | Roustaei |
| 2002/0085110 | A1 | 7/2002 | Mahant-Shetti |
| 2003/0011694 | A1 | 1/2003 | Dierickx |
| 2003/0015647 | A1 | 1/2003 | Guo et al. |
| 2006/0197847 | A1 | 9/2006 | Johnson et al. |
| 2008/0180540 | A1 | 7/2008 | Kim et al. |
| 2010/0182468 | A1 | 7/2010 | Posch et al. |

OTHER PUBLICATIONS

J. Lin, "Imaging with CMOS Single Photon Avalanche Diodes: From Single Devices to 3D-integrated Arrays," Preliminary Research Proposal, Department of Electrical and Computer Engineering, The Johns Hopkins University, pp. 1-12, Apr. 15, 2010.

A. G. Andreou, et al., "Noise Analysis and Comparison of Analog and Digital Readout Integrated Circuits for Infrared Focal Plane Arrays," Proceedings of the 43rd Annual Conference on Information Sciences and Systems (CISS09), Baltimore, MD, pp. 695-700, Mar. 18-20, 2009.

C. G. Rizk, et al., "Flexible Readout and Integration Sensor (FRIS): New Class of Imaging Sensor Arrays Optimized for Air and Missile Defense" (Presentation Poster), The Johns Hopkins University Collaborative Research Symposium, 2009.

W. J. Tropf, et al., "Dim Target Detection Performance using Frame Summing with conventional and FRIS ROIC," The Johns Hopkins University Applied Physics Laboratory, letter A1D-09-U-014, pp. 1-16, Nov. 20, 2009.

Jerris F. Johnson, "Focal-Plane Signal and Noise Model-CTIA ROIC," Oct. 21, 2009, IEEE Transactions on Electron Devices, vol. 56, No. 11, pp. 2506-2515.

* cited by examiner

FLEXIBLE READOUT AND SIGNAL PROCESSING IN A COMPUTATIONAL SENSOR ARRAY

CROSS-REFERENCE TO RELATED APPLICATIONS

This application is a divisional of prior-filed, U.S. Nonprovisional application Ser. No. 14/923,784, filed Oct. 27, 2015, which is itself a divisional of prior-filed, now-issued U.S. Nonprovisional application Ser. No. 13/671,146, filed Nov. 7, 2012, granted U.S. Pat. No. 9,200,954, which issued on Dec. 1, 2015, and which claims priority to and the benefit of prior-filed U.S. Provisional Application Nos. 61/556,612 and 61/556,616, both filed Nov. 7, 2011, the contents of all of which are herein incorporated by reference in their entireties.

STATEMENT OF GOVERNMENTAL INTEREST

Certain research which gave rise to portions of this invention was made with government support under contract number HQ0006-07-D-0001 awarded by the Missile Defense Agency (MDA). The government may have certain rights in the invention.

BACKGROUND

A Sensing Array (SA) is an array of sensing elements at or near the surface of transducing elements. One type of sensing array is a focal plane array (FPA), which has sensing elements arranged at the focal plane of a lens or a mirror. Sensing arrays can be used in imaging, as with light sensors in visible, infra-red and ultra-violet imaging, in electro-chemical sensing arrays, or other electromagnetic sensing arrays such as magnetic field sensing or terahertz imaging. Properly biased sensors each typically convert the sensing quantity into a voltage, current, charge or resistance related to the physical quantity incident on the sensor. Charge coupled devices (CCD) are often used for visible imagers. Infrared (IR) imaging often makes use of infrared sensors and a separate chip called a readout integrated circuit (ROIC), which are bonded together in an assembly as a focal plane array. Sensing arrays such as focal plane arrays or readout integrated circuits may have sensors integrated with circuitry in a system-on-chip. A Computational Sensing Array (CSA) is an array of computational structures at, near or including a sensing array (SA).

Responses of individual elements in the array can exhibit variability as a result of differences in the sensors in a specific array. Variability includes, but is not limited to sensors having different zero-signal levels and/or different gains. Variability that is time-varying manifests itself as temporal or spatial noise. Stationary spatial variability/noise is often called non-uniformity. This can be corrected across the array of pixels by applying a variability correction. Time-dependent variability can also be introduced in the process of quantizing the continuous time, continuous value signal to yield a continuous or discrete time discrete value signal. Generally, a correction process is applied using a processor and software, for example a digital signal processor (DSP), as a postprocessing operation after the individual sensing elements have been read out to a memory external to the sensing array. Applying variability correction, for example non-uniformity correction (NUC), as a postprocessing operation using a processor and software is common practice in sensor arrays, including imaging arrays that are scanned such as CMOS or CCD imagers. Doing the latter is energy inefficient and resources inefficient and cannot always be performed, especially in event-based sensor arrays where response is necessary at time scales beyond those involved with software-based NUC correction. There is a need in the art for a solution which overcomes the drawbacks described above.

SUMMARY

Embodiments of a sensing array and a method for transducing in a sensing array are herein disclosed. The sensing array may be implemented as an electronic circuit, an integrated circuit, a system-on-chip, a readout integrated circuit or a hybrid in electronic, mechanical, chemical and/or bio-physical arrays. Embodiments may have sensors integrated on-chip, bonded or otherwise connected to the circuits electromagnetically or electrochemically coupled to the array of the chip.

Some embodiments include a Computational Sensing Array (CSA) electronic circuit. The circuit includes an array of sensing elements. Each sensing element unit has a transducer, a collection unit, a conditioning structure and a sensing element preprocessing unit. The transducer is configured to produce a first signal in response to a physical signal. The collection unit is coupled to the transducer. The collection unit is configured to produce a second signal derived from the first signal. The second signal represents the transduced physical quantity and it could be of the continuous-time/continuous-value, or continuous-time/discrete-value type. The conditioning unit is coupled to the collection unit. The conditioning unit is configured to modify the second signal. The sensing element preprocessing unit is coupled to the conditioning unit. The sensing element preprocessing unit is configured to produce a value of the second signal as modified. The sensing element preprocessing unit is further configured to produce an indication of change of the first signal, which may represent a change in the environmental condition or a time varying change within the transducer.

Some embodiments include a computational sensing array that may be used for imaging. The computational sensing array includes an integrated circuit with an array of sensing elements. Each sensing element has a collection unit, a conditioning unit and a space to time multiplexing unit. The collection unit is operable to be coupled to a transducer. The collection unit is configured to produce a continuous-time/discrete-value or discrete-time/discrete value signal, based on activity of the transducer. The conditioning unit is coupled to receive the continuous-time/discrete-value or discrete-time/discrete value signal. The conditioning unit has a state-holding and collector element of continuous-time/discrete-value or discrete-time/discrete value signal type, which may be an accumulator or an integrating state holding element. The state-holding and collector element is configured to produce an adjusted value from the state-holding and collector element of the continuous-time/discrete-value or discrete-time/discrete value signal. The space to time multiplexing unit is configured to output the adjusted value.

Some embodiments include a method for transducing in the sensing array. The sensing array includes a plurality of sensing elements. Actions of the method take place in each sensing element. The method includes generating a first continuous-time/continuous-value signal from a transducer. Then, in response to receiving the first continuous-time/continuous-value signal, the method includes generating a signal that can be modulated by a discrete or continuous time signal. The discrete or continuous time modulated signal represents a value of the first continuous value continuous time signal. For example, in one embodiment a count of pulses of a modulated signal over a specified period of time represents a value of an analog signal from which the modulated signal is derived. Method steps include applying an offset and/or a gain to a value of the modulated signal. The method includes generating a multibit Boolean binary or non-Boolean symbolic representation of the signal, i.e., a vector. The latter represents a value of the modulated signal with the applied offset or gain. The method includes storing the present value/state of the multibit symbolic representation in a first array of state holding elements of the proper type (continuous-time/discrete-value or discrete-time/discrete value signal). A previous value of the multibit symbolic representation, i.e., a value from a previous frame or epoch, is retained in a second array of state holding elements. The first and second arrays of state holding elements are local to the computational sensing element.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
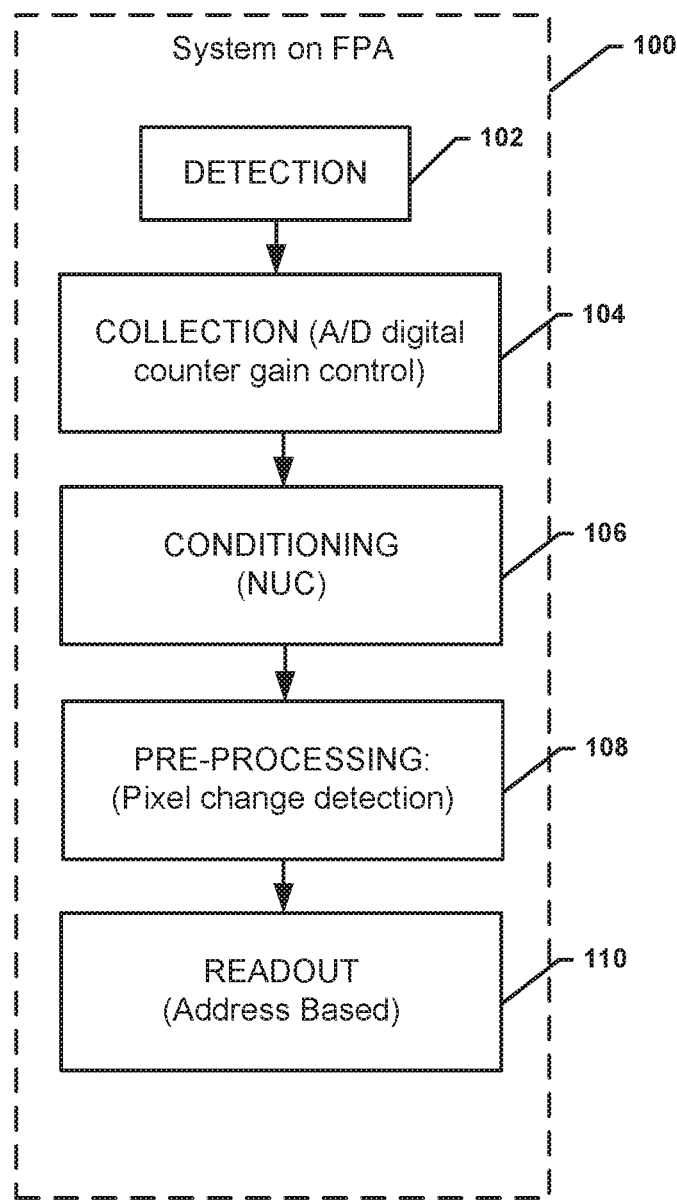
FIG. 1A is a block diagram of a high level architecture of a Computational Sensing Array (CSA).

Embodiments of a computational sensor array as described herein employ a sensor system architecture with time varying (non-ergodic) compensation for temporal and spatial variability (i.e., conditioning) in each sensing element (e.g., pixel for light sensing applications), and relevance indexing to decrease the bandwidth, processing and/or computing burden of computing and/or other devices external to the sensor array. Particularly, transmission and postprocessing of array data is decreased. In addition, it allows for multi-mode operation such as passive and/or active as well as multi-band or multi-color. The array in this case becomes a type of sensor system-on-chip. Some embodiments have transducers integrated with circuitry on the same chip. Some embodiments have transducers flip chip bonded to the circuits layer making a focal plane array (FPA). Other embodiments include multiple layers as 3-D structures where each tier can apply different technology and may involve solid-state and other sensing arrays. Other mounting and bonding arrangements of sensors and the computational sensing array may be devised.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. Specifically, some embodiments are described in terms of pixels, pixel units and a focal plane array of pixel units, while other embodiments are described in terms of sensing elements and sensing arrays with arrays of sensing elements, or computational sensing arrays. Embodiments of pixel units may serve as embodiments of sensing elements, and embodiments of focal plane arrays may serve as embodiments of sensing arrays. Some embodiments are described in terms of registers. A register, it should be appreciated, is an example or a subset of the class of state holding elements. Some embodiments are described in terms of sensors or detectors, which are examples of transducers. An accumulator is herein used as a type of integrating state holding element. A frequency modulated signal is a type of modulated signal. A frame is a type of epoch. Autoscanning is a type of autonomous operation. Analog signals are considered a subset of continuous time, continuous value signals. A binary-valued signal is a type of discrete-valued signal. Priority is a type of relevance. A multibit word is an example of a type of vector.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the embodiment of a Computational Sensing Array 100 shown in FIG. 1A, detection, collection, conditioning, preprocessing and readout are all performed at the CSA level. This contrasts with known architectures of CCD or CMOS imaging FPAs, in which detection is done at the pixel level, collection is performed at the row or column level, readout is performed at the row or column level, and conditioning and postprocessing are performed by a computing device external to the CCD or CMOS FPA device.

Figure 1B:
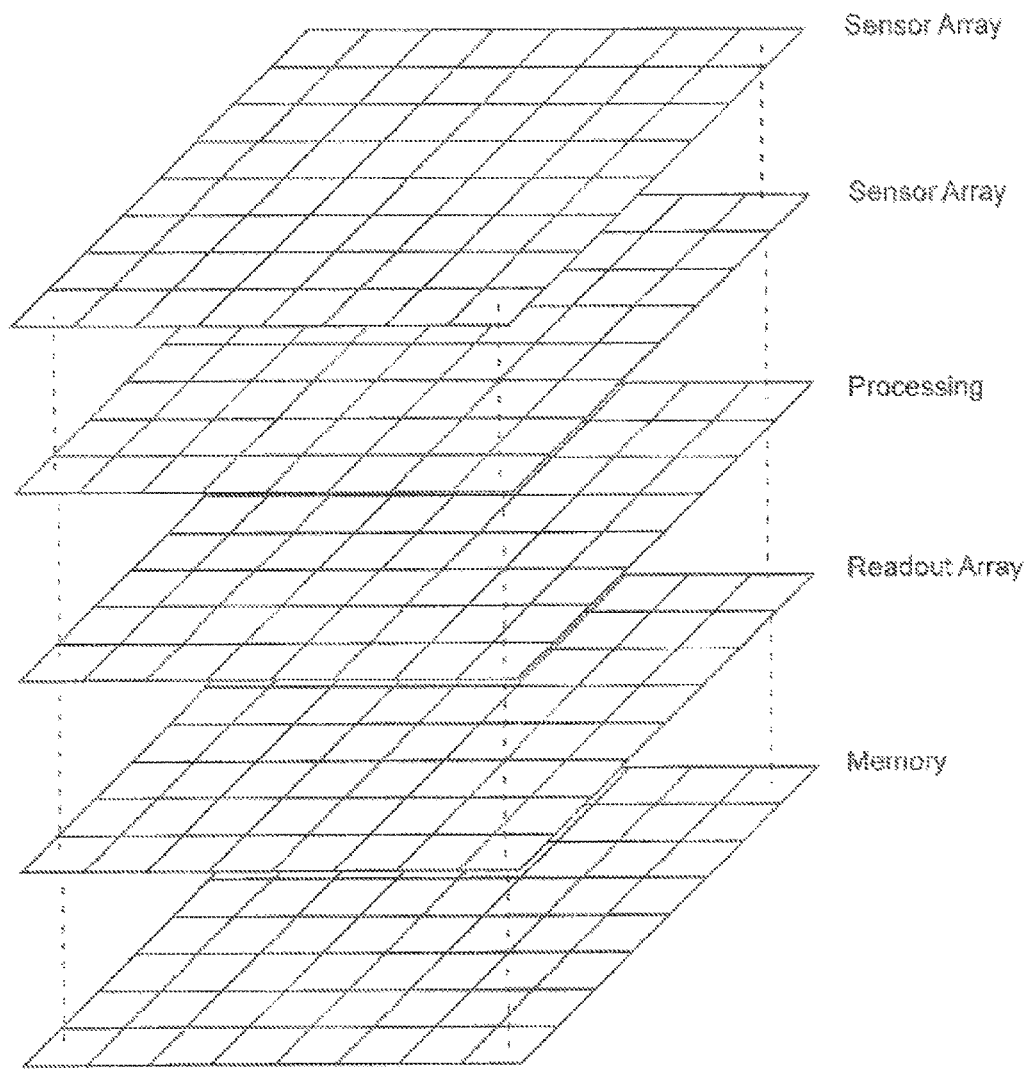
FIG. 1B is a perspective view of multiple computational arrays in layers, as used in an embodiment of the Computational Sensing Array of FIG. 1.

In some embodiments the Computational Sensing Array 100 shown in FIG. 1A includes physically multiple CMOS silicon computational arrays in layers interconnected vertically through interconnects, so that the multiple arrays are in close physical proximity to each other (see FIG. 1B).

In some embodiments, each pixel in Computational Sensing Array 100 has a detection unit 102, in which a sensor, detector or transducer receives photons. Biasing to the sensor, detector or transducer, applied in the pixel (i.e., the sensing element), allows the sensor to show a change in voltage, current, charge or resistance in response to receiving the photons. This response can then be collected so that a value can be derived, relating to the detected photons.

In some embodiments of the Computational Sensing Array 100 for light sensing applications, each pixel in a focal plane array (or sensing element in a sensing array) has a collection (i.e. conversion and storage) unit 104, in which the response of the sensor or detector is collected and converted to some type of signal. The signal may be a continuous time, continuous value signal, an analog signal such as a time varying voltage or current, a digital signal such as a multibit digital word or vector, a discrete value continuous time signal such as a frequency modulated binary valued signal, or other type. In one embodiment, the collection unit has an analog to digital converter. In other embodiments, the collection unit has a frequency modulating analog-to-digital converter with a digital counter. In alternative embodiments, the collection unit has a frequency modulating analog-to-digital converter with a digital counter and gain control.

In some embodiments, each sensing element (or pixel) in the Computational Sensing Array 100 has a time varying conditioning or compensation unit 106, in which the collected response of the sensor or detector is modified or adjusted for temporal and/or spatial variability, i.e., conditioned or compensated. In one embodiment, the time varying compensation unit has a nonuniformity correction, which is performed on the pixel prior to readout of the pixel, i.e., is performed local to the pixel as preprocessing in the array.

In some embodiments, each sensing element in the sensing array 100 (or pixel in the focal plane array) has a preprocessing unit 108, in which a type of preprocessing is applied to the pixel prior to readout of the pixel. In one embodiment, the preprocessing unit has a pixel change detection. In one embodiment, the preprocessing unit cooperates with a change detection module that is column-based or row-based.

In some embodiments, each sensing element in the sensing array 100 (or pixel in the focal plane array) has a preprocessing unit 108, in which the mean and variance of the sensing element (or pixel) is calculated. In one embodiment, the preprocessing unit cooperates with a mean and/or variance discrimination module that is column-based or row-based.

In some embodiments, each sensing element in the sensing array 100 (or pixel in the focal plane array) has a relevance indexing unit that ranks each sensing element (i.e., pixel for light sensing applications) for readout (i.e., output of the array) unit 110. This relevance unit automatically places the sensing elements or pixels deemed of interest on the data bus to be accessed by the external device. The data includes the conditioned sensing element or pixel values or intermediate signal values and the unique address and time stamp. A processor or other device external to the focal plane array can use the sensing element or pixel address to read out the sensing elements or pixels, i.e., read the collected, conditioned, i.e., compensated, and/or preprocessed pixel values, by sending the unique address and a read request to the focal plane array (or sensing array 100). Row decode and column decode circuitry is applied to route the read data out from the pixel readout units to a data bus in a manner similar to a memory read. Multiple such circuits may be present in order to read out multiple pixels simultaneously. Further embodiments of the Computational Sensing Array 100 have various combinations of the above-described units, with one or more units deleted from, substituted in or added to each pixel. Some embodiments have the ability to readout any intermediate signal value, and in one embodiment to read the raw sigma-delta bitstream, from any pixel or sensing element.

Figure 2:
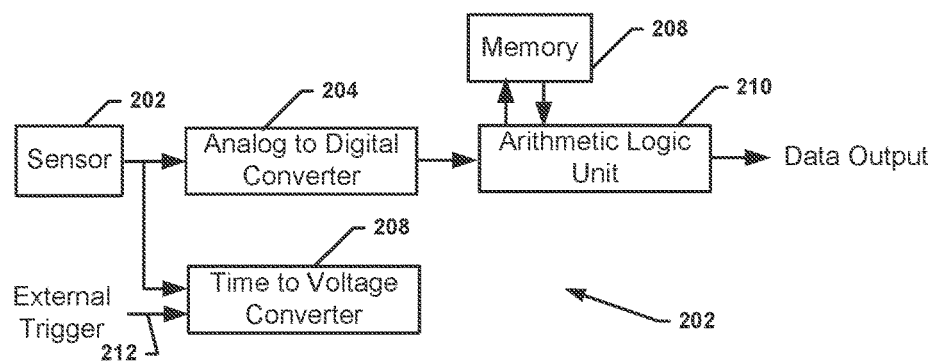
FIG. 2 is a block diagram of a high level architecture of a computational sensing element (CSE) in the CSA of FIG. 1A.

An embodiment of the architecture of a sensing element (or pixel unit) is shown in FIG. 2. A sensor 202 is coupled to an analog-to-digital converter 204 and a time to voltage converter 206. An external trigger 212 starts the time to voltage converter 206, which produces a sensed voltage relating to an environmental condition sensed by the sensor 202, after a controlled time interval. In one embodiment, the time to voltage converter includes an integrator which integrates current or charge flowing to or from the sensor 202. The analog-to-digital converter 204 produces a digital output as a conversion of the sensed voltage from the time to voltage converter 206. In one embodiment, the analog-to-digital converter 204 includes a sigma delta modulator, which produces a frequency modulated binary valued signal representing the sensed value from the sensor 202.

Output of the analog-to-digital converter 204 is received by the computational structure 210. In one embodiment, the computational structure 210 includes an arithmetic logic unit. The computational structure 210 is coupled to a memory 208. In one embodiment, the computational structure combines the converted value from the analog-to-digital converter 204 with data from the memory, thereby modifying the sensed value. The modified sensed value is then available at the data output of the computational structure 210.

Figure 3:
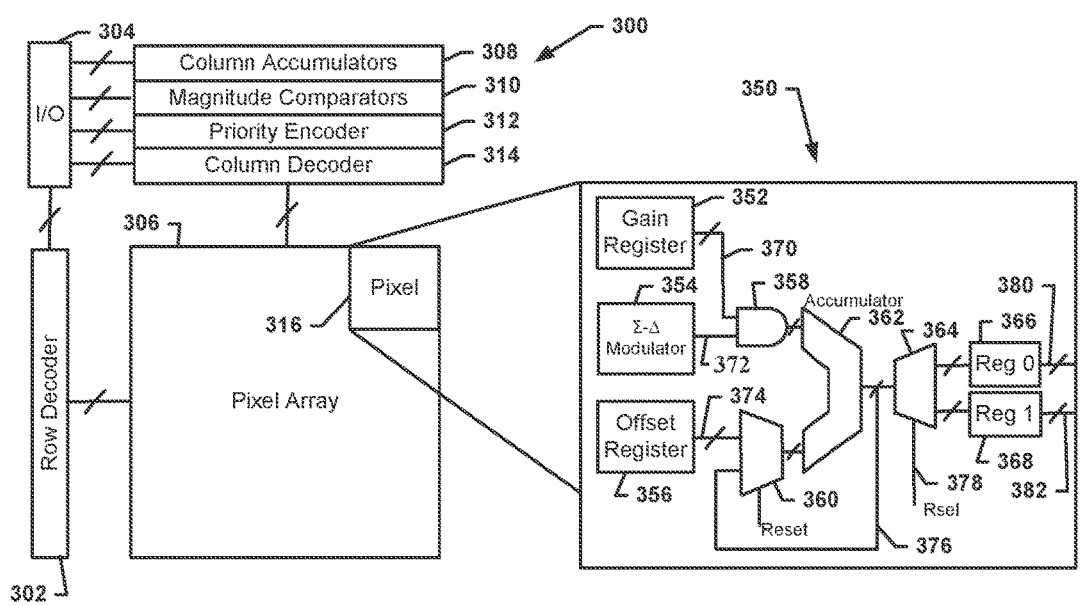
FIG. 3 is a block diagram of an architecture of a CSE and an architecture of a CSA, in accordance with an embodiment of the present invention.

Moving down one level, architecture of a Computational Sensing Array 300 and a sensing element 350 in the Computational Sensing Array 300 are shown in FIG. 3. Embodiments of the Computational Sensing Array 300 include embodiments of focal plane arrays, and embodiments of the sensing element 350 include embodiments of pixels and pixel units. The sensing array 306 (which may be embodied as a pixel array) includes an array of sensing elements 316 (which may be embodied as pixel units), one of which is shown for illustration. A row decoder 302 and a column decoder 314 are used to address the sensing elements or pixels as appropriate, in a manner comparable to a standard memory, e.g., a random-access memory (RAM). An I/O block 304 is used for data input and output to various blocks and the sensing array 306, in a manner comparable to standard I/O blocks of peripherals. Additional blocks of the Computational Sensing Array 300 will be discussed following the description of the sensing element 350 architecture.

In one embodiment, activity of a sensor is converted from analog to digital. In another embodiment, activity of a sensor is converted from a continuous value, continuous time signal (of which class an analog signal is a subset) to a digital value. In the embodiment of a sensing element 350 shown in FIG. 3, analog-to-digital conversion of sensor activity is performed in part by a sigma delta modulator 354. The sigma delta modulator 354 produces a pulse train with a time varying frequency, for example, a binary value analog time signal or a frequency modulated signal. The number of pulses produced during a specified time interval is a function of the analog voltage, current or charge seen at the output of the sensor. This characteristic operation of a sigma delta modulator is known as pulse density modulation or pulse frequency modulation. Conversion to a digital value consists of counting the pulses during the specified time interval. This could be performed in one embodiment without gain modification by using a standard binary counter with a sufficient number of bits to avoid overflow with a maximum count. The binary counter would be initialized to zero, and count pulses by incrementing with each pulse, e.g., by using the pulse signal as a clock for an incrementing counter or by using the pulse signal as a count enable.

In the embodiment shown in FIG. 3, the sensing element 350 includes a gain register 352, the sigma delta modulator 354, an offset register 356, and an accumulator 362. In one embodiment, the accumulator 362 includes a fixed point adder or other computational structures. The gain register 352 is read/write accessible and stores a gain value which can be less than one, equal to one or greater than one. In other words, the gain value has a range spanning to both sides of unity gain, inclusive. In one embodiment, the gain value is stored as a fixed point number. Further embodiments can use floating point arithmetic, and binary or binary coded decimal numbers. The offset register 356 is read/write accessible and stores an offset value which can be less than zero, zero, or greater than zero. In other words, the offset value has a range spanning to both sides of zero offset, inclusive. In one embodiment, the offset value represents the dark current or dark voltage of a sensor, which relates to the activity of the sensor when no light is incident. In another embodiment, the gain value represents the slope of the sensor response to light incident on the sensor. As each sensing element or pixel has a respective gain register 352 and a respective offset register 356, the sensors can be calibrated and individual differences accounted for across the array, with the sensing elements or pixels having individual adjustment to the sensed values accordingly.

In some embodiments, the offset and/or gain are modified in a time varying manner based on sensing element or pixel, and/or local, and/or global characteristics, as determined by an external controller or by additional circuitry internal to the sensing element or pixel or the computational sensing array.

Modification of the sensed value, in each sensing element or pixel, proceeds as follows. At reset, the offset register 356 value is placed into the accumulator 362. This action is controlled by the multiplexer 360, which can select a multibit value from the output 374 of the offset register 356, or can select the output 376 of the accumulator 362. Further embodiments can be readily devised for loading the value of the offset register into the accumulator 362. When reset is released, counting of pulses from the sigma delta modulator 354 proceeds. It should be understood that the reset signal may be an externally or internally generated signal.

When the output of the sigma delta modulator 354 is zero, i.e., no pulse is present, the multibit output of the AND gate 358 is zero, and the accumulator 362 retains the previous accumulated value. When the output of the sigma delta modulator 354 is a binary one, i.e., a pulse, the multibit output of the AND gate 358 is equal to the multibit output 370 of the gain register 352, and the accumulator adds the gain value to the previous accumulated value. The accumulator thus increments by the gain value with each pulse from the sigma delta modulator 354. The gain value is an incremental value added, i.e., counted, in response to each of a plurality of pulses from the sigma delta modulator. In some embodiments, a specified interval timer may control the length of time over which the pulses are counted. In one embodiment, the interval timer is programmable. In some embodiments, the sigma delta modulator may be of the multibit type, in which case the output is multiplied (rather than ANDed) with the gain register output.

It should be appreciated that, by using the gain value and the offset value in the above-described manner, the sensing element or pixel applies an offset and a gain as a modification or a correction to the sensed value from the sensor. Two-point nonuniformity correction is achieved by starting the accumulator at a non-zero value, for offset correction, and incrementing by a fractional value greater or less than one, for gain correction. In one embodiment, an ideal sensor would receive a zero offset and a unity gain. It should also be stated that a more sophisticated nonuniformity correction can be implemented (e.g. 4-point NUC)

Further embodiments contain multiple gain registers, such that the particular gain value used by the accumulator is controlled by an external or internal signal. In this manner, the set of gains can be switched instantaneously in order to, for example, account for a change in the environment, sensor biasing, sensor type, or to facilitate synchronous detection of weak signals.

The output 376 from the accumulator 362 can be selectively latched in either of two output registers 366, 368, as directed by a register select 378 and a demultiplexer or selector 364. In one embodiment, one of the output registers 366, 368 stores the most recent sensing element or pixel value and the other of the output registers 366, 368 stores the immediately preceding sensing element or pixel value or another prior or preceding value of the sensing element or pixel. Further embodiments, such as storing multiple preceding values or storing only the most recent sensing element or pixel value, are readily devised. It should be appreciated that one output register 366 can be read out by an output port 380, and the other output register 368 can be read out by a further output port 382.

Further embodiments contain multiple accumulator circuits within the sensing element or pixel controlled by additional reset signals, so that the respective time intervals are longer, shorter, and/or overlapping. It should be understood that such additional accumulator circuits may make additional output registers, and/or gain registers, and/or offset registers desirable.

Returning to the Computational Sensing Array 300 in FIG. 3, the embodiment shown includes column accumulators 308, magnitude comparators 310 and priority encoder 312. The magnitude comparators 310 are coupled to the output registers 366, 368 of the sensing elements 316, 350. In some embodiments, the magnitude comparators 310 detect if the sensing element or pixel output is within an acceptance interval. Further embodiments detect if the variance of the sensing element or pixel output is within an acceptance interval. Further embodiments detect if the difference between the two output registers of the sensing element or pixel of the currently selected row are within an acceptance interval. In this manner, changes in sensing element or pixel values can be detected. High and low thresholds of the acceptance interval are programmable on a column by column basis, and/or row by row, and/or sensing element by sensing element or pixel by pixel, in some embodiments. In some embodiments, the high and low thresholds are adjusted automatically based on the sensing element or pixel output or a local and/or global measure.

Further embodiments contain a time counter in each sensing element or pixel which can be reset when the sensing element or pixel is read, and whose value can be used to further discriminate which sensing element or pixels are read out. In these embodiments, additional comparators detect if the time counter value is within an acceptance interval. Readout may require both magnitude and time be within acceptable intervals.

The priority encoder 312 sorts the acceptable sensing elements or pixels, e.g., from left to right, and can output column addresses of acceptable sensing elements or pixels sequentially in one embodiment. The magnitude comparators 310 and the priority encoder 312 thus form an autonomous mechanism, which can alert a CPU (central processing unit) or external controllers or devices to readout only sensing elements or pixels of interest, which may represent a small fraction of the total array and reduce processing overhead. The column accumulators 308 include a column accumulator for each column of the sensing element array 306, which sums the intensity of all of the sensing elements or pixels in the column. To prevent overflow, the column accumulators have more bits than the sensing element or pixel accumulators, in some embodiments. The column accumulators 308 provide information useful for algorithms requiring average sensing element or pixel intensity which includes sensing elements or pixels that are not read out.

Further embodiments sort the sensing elements or pixels according to rank rather than in a fixed positional order. In these embodiments, the rank is the amount by which the sensing element or pixel output exceeded the threshold. For example, in the case of change detection, the sensing elements or pixels with the greatest amounts of change may have a higher or lower priority than the sensing element or pixel with more modest amounts of change.

Further embodiments of the sensing element or pixel contain circuitry to automatically remove the sensing element or pixel from consideration by the autonomous mechanism. For example, a sensing element or pixel may compare its variance to a threshold and signal the autonomous mechanism (e.g., relevance indexing) to skip it when the threshold is exceeded.

Various combinations of components of the sensing element 350 of FIG. 3 can be used in embodiments of the Computational Sensing Array 100 of FIG. 1A. For example, one embodiment of the conditioning unit 106 includes the nonuniformity correction applying the gain register 352 and the offset register 356 of FIG. 3. The accumulator 362 and associated logic may be located in one or both of the collection unit 104 and the conditioning unit 106. Another embodiment of the preprocessing unit 108 includes the output registers 366, 368 of FIG. 3. Other embodiments of the preprocessing unit 108 include the demultiplexer or selector 364 of FIG. 3. One embodiment of the readout unit 110 includes the output ports 380, 382 of FIG. 3. Further embodiments of the readout unit 110 include bus drivers and other logic associated with reading data.

Various combinations of components of the Computational Sensing Array 300 of FIG. 3 can be used in embodiments of the Computational Sensing Array 100 of FIG. 1A. For example, the column accumulators 308, the magnitude comparators 310, and the priority encoder 312 of FIG. 3 are located above the columns in one embodiment, or have portions thereof integrated into the preprocessing unit 108 in further embodiments.

Figure 4:
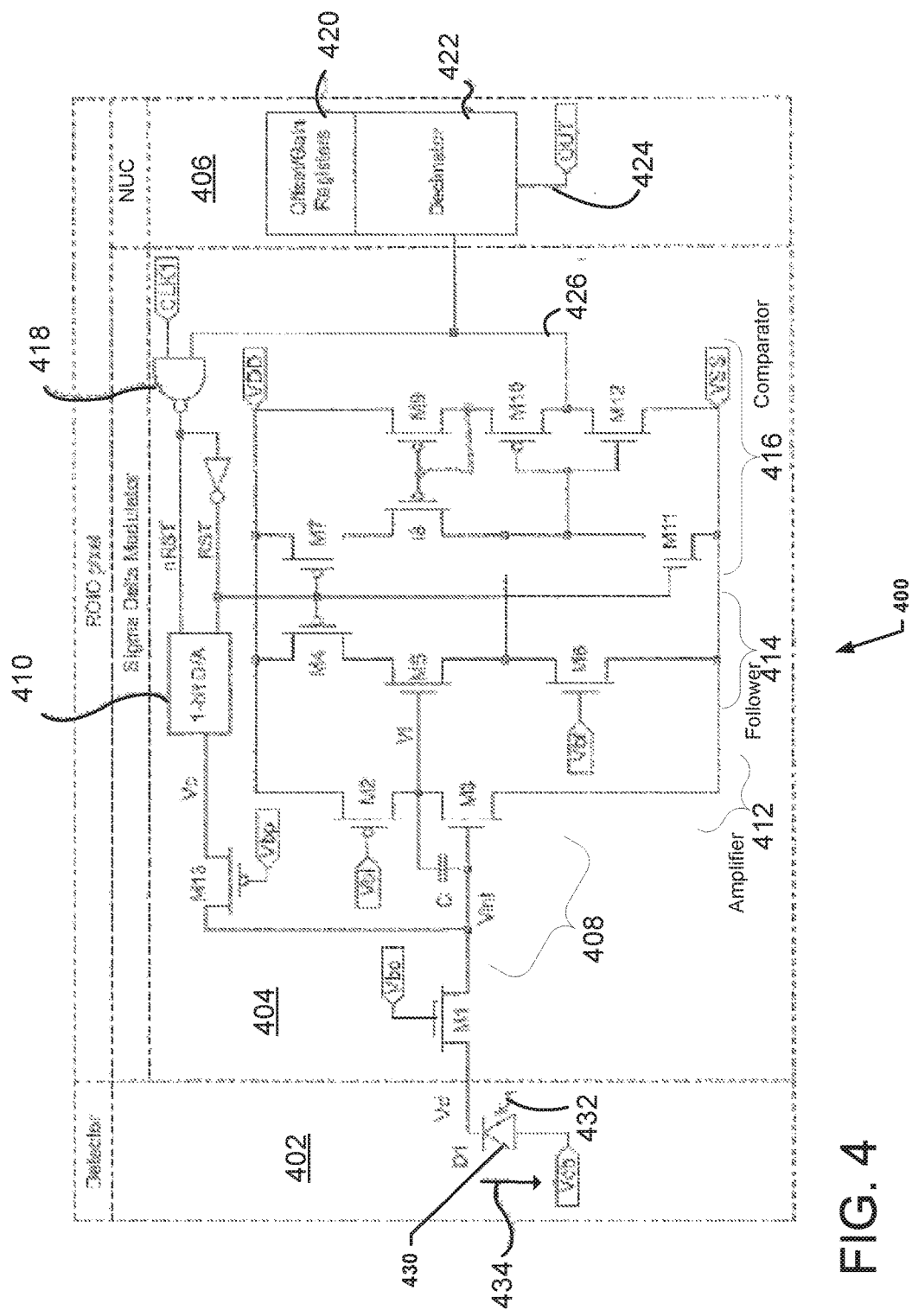
FIG. 4 is a combination circuit and block diagram of a CSE in an embodiment of the CSE architecture of FIG. 3.

In the sensing element 400 shown in FIG. 4, the sensor or detector 402 is a photodiode 430, which produces a current 434 in proportion to the arriving photons 432. One embodiment employs a single photon avalanche detector (SPAD) made from an avalanche diode operating in Geiger mode. A photodiode operating in post-avalanche mode may also be used. Other types of sensors or detectors can be used in further embodiments of pixels or sensing elements. For example, further embodiments can use sensors that detect various types of environmental conditions such as electromagnetic radiation in various ranges across the spectrum, sound, acceleration, ionic concentration, force, pressure, and so on. In the embodiment in FIG. 4, the detector 402 is coupled to a sigma delta modulator 404 which produces a train of pulses on a sigma delta output 426 related to the current 434 through the detector 402. Other types of sigma delta modulators or other types of analog-to-digital converters are used in further embodiments.

An embodiment with avalanche photodiodes can have multiple modes of operation. In linear mode, below breakdown voltage, photocurrent is integrated and sensed with the sigma delta modulator. In above breakdown, Geiger-mode, a counter is used to count pulses induced by single-photon events. A third mode, time-of-flight, can be operated with the avalanche photodiodes biased in Geiger-mode and an external light source. The external light source illuminates an object to be imaged, and the flight time of the photons from light source to reflecting off the object and being detected by the photodiodes is measured. The measurement can be performed with a time-to-digital converter or time-to-analog converter.

The sigma delta modulator 404 includes an integrator 408 made up of a capacitor and an amplifier 412. The integrator 408 produces a downward sloping or upward sloping voltage, and the sloping voltage is buffered through the follower 414 and used as an input to the comparator 416. The comparator 416 produces a pulse on the comparator output 426 whenever the buffered voltage crosses the threshold voltage, thereby producing the pulse train characteristic of sigma delta converters. The comparator output 426 is fed back through the NAND gate 418 to the one bit digital to analog converter 410, closing the loop in the sigma delta modulator 404. The comparator output 426 is fed forward to the offset/gain registers 420 and decimator 422, which produce a pixel output 424. In one embodiment, the offset gain registers 420 and decimator 422 include the accumulator 362, AND gate 358 and multiplexor 360 of the sensing element 350 shown in FIG. 3. In further embodiments, other circuits performing related functions are included. In the embodiment shown in FIG. 4, the offset/gain registers 420 and the decimator 422 are included in the nonuniformity correction unit 406 which is coupled to the sigma delta modulator 404.

In one embodiment, the offset/gain registers 420 of FIG. 4 includes the offset register 356 and the gain registers 352 from FIG. 3. In another embodiment, the decimator 422 of FIG. 4 includes the accumulator 362 of FIG. 3. In signal processing, it should be appreciated that decimation is the act of dropping samples. As the output of the accumulator 362 is sampled once per frame, the accumulator 362 accomplishes the action of decimation.

Various components of the sensing element 400 of FIG. 4 can be used in embodiments of the Computational Sensing Array 100 of FIG. 1A. For example, one embodiment of the detection unit 102 includes the detector 402, more specifically the photodiode 430, of FIG. 4. Another embodiment of the collection unit 104 includes the sigma delta modulator 404 of FIG. 4. One embodiment of the conditioning unit 106 includes the nonuniformity correction unit 406 of FIG. 4.

Figure 5:
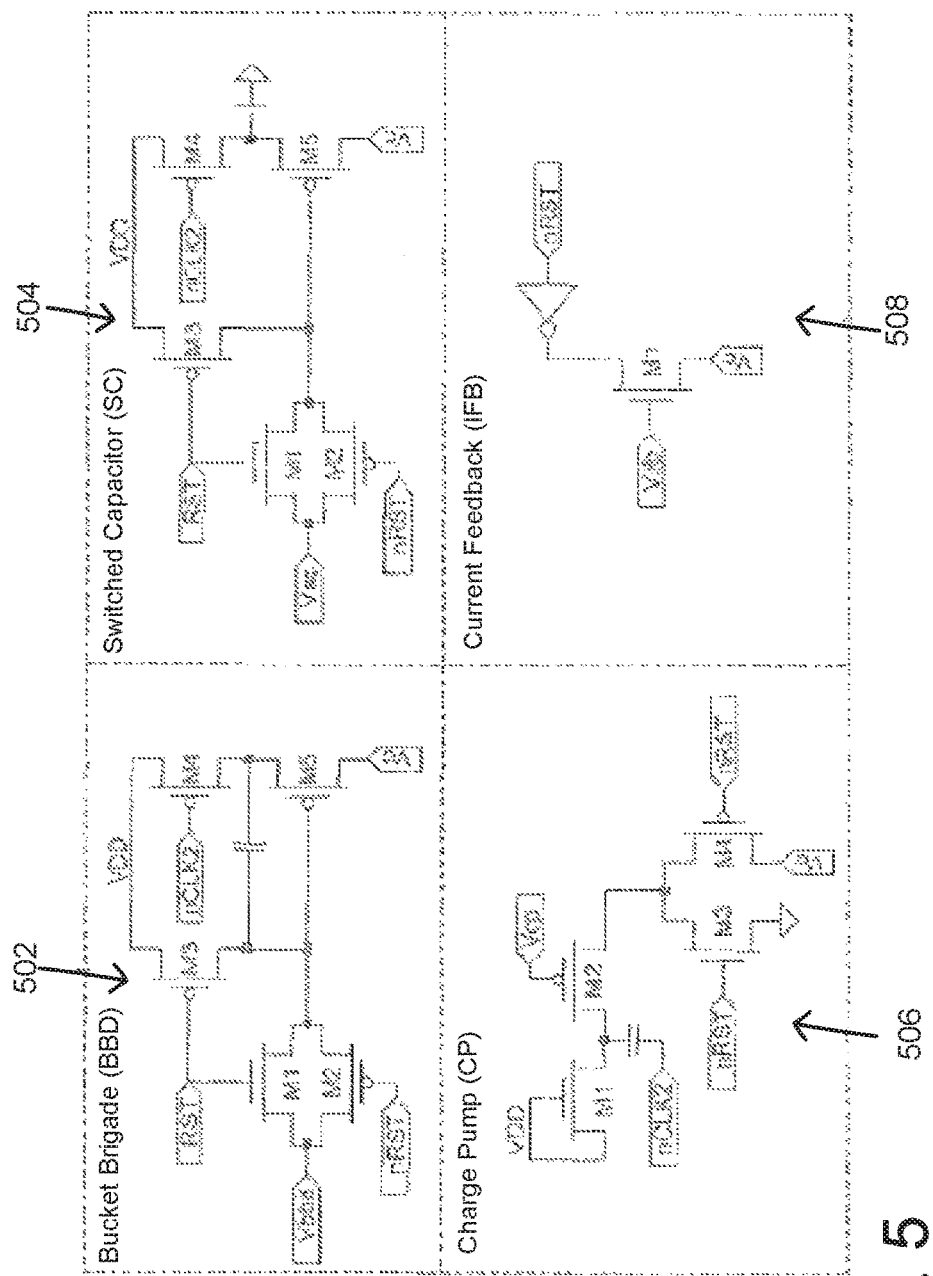
FIG. 5 is a group of circuit diagrams, each showing an embodiment of a circuit useful in continuous-time/discrete-value or discrete-time/discrete value signal in FIG. 4.

FIG. 5 shows circuits 502, 504, 506, 508 for biasing detectors and performing the one bit digital to analog conversion as shown in FIG. 4. The bucket brigade circuit 502, the switched capacitor circuit 504, the charge pump circuit 506 and the current feedback circuit 508 are available for use with appropriate detectors in embodiments of the sensing element 400. The current feedback circuit 508 switches on a bias current for a portion of a clock period to charge the integration capacitor, when the comparator output is high. The charge pump circuit 506 transfers a charge to the integration capacitor if the comparator output is high, and shunts to ground if the comparator output is low. The switched capacitor circuit 504 alternately switches a capacitor between two voltages to emulate the behavior of a resistor, and acts as a charge metering circuit. A second switch is activated if the comparator output is high. The bucket brigade circuit 502 acts similarly to the switched capacitor circuit, but couples a capacitor to a control signal rather than to ground. Further biasing and digital to analog circuits and matchings with detectors are readily devised by a person skilled in the art.

Figure 6A:
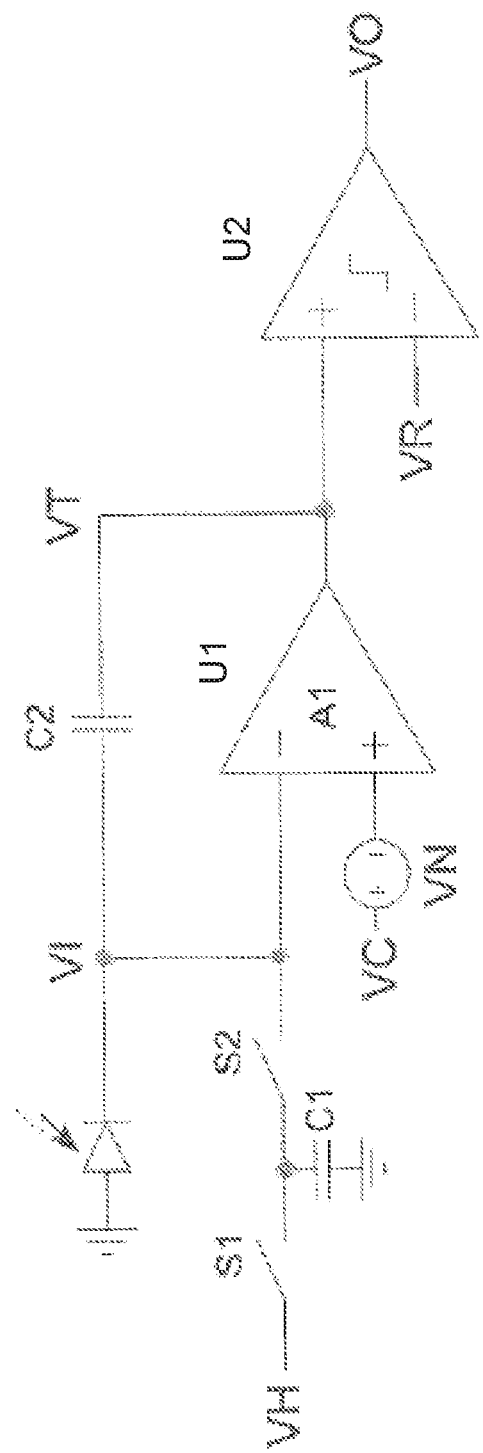
FIGS. 6A-C are circuit diagrams of embodiments of a front end integrating amplifier or integrator and transducer that can be used in an embodiment of the CSE architecture of FIG. 3.

FIG. 6A shows a biasing and integrating circuit 600 for use in one embodiment of the sensing element 400. The circuit operates by autozeroing the offset introduced from the random shift in the voltage threshold. The circuit reduces the random telegraph signal (RTS) noise effect. In this frontend, the photocurrent is integrated on C2 through amplifier U1 with an open-loop DC gain of A. U1 clamps the voltage at VI to VC so that the diode maintains a constant reverse bias as well as fixing the amount of feedback charge added through capacitor C1 and switches S1 and S2. Comparator U2 senses when the integrated photocurrent VT surpasses a threshold set by VR. This will trigger a positive digital pulse, VO. This signal can be used to control switches S1 and S2 to add a feedback charge onto VI. The amount of feedback charge added is $Q=C1*(VH-VC)$. In the sigma-delta architecture, the number of times the feedback charge is added can give an estimate to the total amount of charge integrated within a given time period. The accuracy of this estimate depends on the accuracy of the feedback charge, and the accuracy degrades due to random telegraph signal (RTS) noise which is prevalent in CMOS technologies with very small feature size. The RTS noise is thought to arise from charges randomly trapped and released in the conduction channel of the MOSFET. This leads to random fluctuations in the threshold voltage, which can be modeled by a random offset voltage to one of the inputs to the amplifier (VN on positive input of U1). With this random offset voltage, the feedback charge becomes $Q=C1*(VH-VC+VN)$, where VN is a small random voltage fluctuation.

Figure 6B:
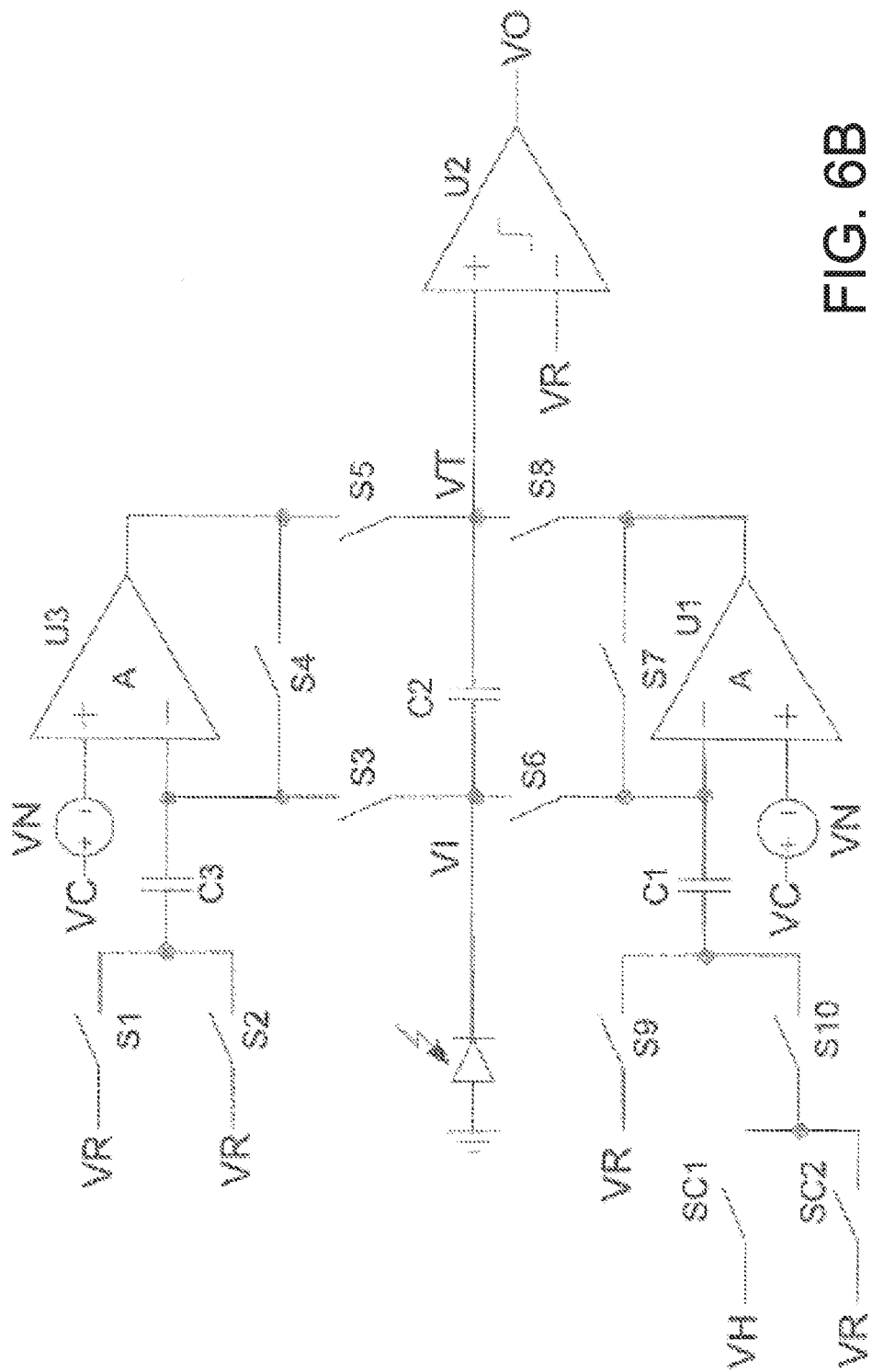

Having discussed the simplified basic architecture for RTS in FIG. 6A, we now describe the operation of the ping-pong frontend. FIG. 6B shows a diagram of the ping-pong frontend designed to mitigate RTS noise. Switches S1-S10 are connected to a two-phase clock where odd and even numbered switches are controlled by opposite phased clocks, e.g. S1 is closed (open) and S2 is open (closed) when CLK1 is high (low) and CLK2 low (high). Additional switches are added so that U1 can undergo an autozeroing phase; during this phase, the amplifier is disconnected from C2 and connected in a unity-gain configuration (S6 and S8 open, S7 closed). Assuming that the open-loop DC gain A of the amplifier is much greater than one, the voltage across C1 is approximately equal to the offset voltage VN, $(A/(1+A))*VN \approx VN$. After the autozeroing phase, the amplifier is reconnected to C2. The residual offset is equal to $VN/A+Qinj/C$, where Qinj is charge injection from the switches. The offset introduced by the RTS noise is thus proportionally reduced by the amplifier's DC gain. In order to practically obtain a high DC gain without utilizing too much area or power in a sensor array, the amplifiers are implemented as regulated cascade inverting amplifiers.

An additional amplifier, U3, is added to integrate the charge on C2 while U1 is autozeroing. When U1 is integrating the charge, U3 autozeros and stores its offset on C3. During U1's integration phase, if VT is higher than the comparator threshold, VR, VO will go high. This signal can be used to control switches SC1 and SC2. If VO is high, than SC1 is closed and a feedback charge of $Q=C1*(VR-VH)$ will be added to C2; otherwise, SC2 is closed and no feedback charge is added. In order that the feedback is added during the correct phase, U2 is implemented as a clocked comparator that samples VT during U1's autozero phase.

Figure 6C:
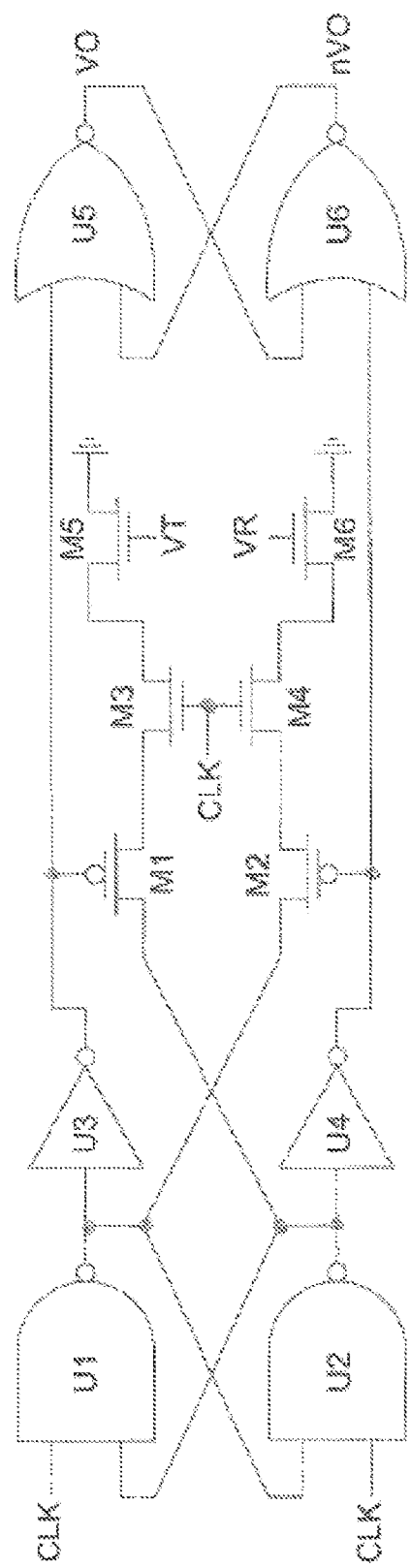

In another embodiment the CSA array may involve multiple transducers per array unit. FIG. 6C shows the dynamic latched comparator used in the front-end when two-color integration is desired. For single-color integration, the integrate and fire comparator suffices, however it cannot be used for two-color integration where the signal can integrate up or down due to the direction of the positive feedback. Besides being able to handle two-colors, the dynamic latched comparator is attractive in that it uses minimal power as power is consumed only when the comparator is making a decision. As the decision process usually occurs within a couple of nanoseconds, the dynamic power draw is kept low. U1 and U2 perform the comparison, U3 and U4 buffer the output of U1 and U2, and U5 and U6 latch the output. Transistors M1-M6 are added to minimize kickback noise on the integration node VT. Instead of sampling VT and VR with switches, their value is converted to a current that draws charge off the output of U1 and U2. When CLK is low, the output of U1 and U2 is reset high, U3 and U4 output low, and M1 and M2 are switched on. When clock pulses high, M3 and M4 are switched on, thus M5 and M6 can drain charge off the output of U1 and U2. If VT is greater than the comparator threshold, VR, it will hasten the feedback to switch the output of U1 to low and U2 to high. At this point the comparator has made a decision, and M1 and M2 are shut off. M1 is shut off because the output of U3 goes high, and M2 is shut off because its source goes to zero.

Figure 7:
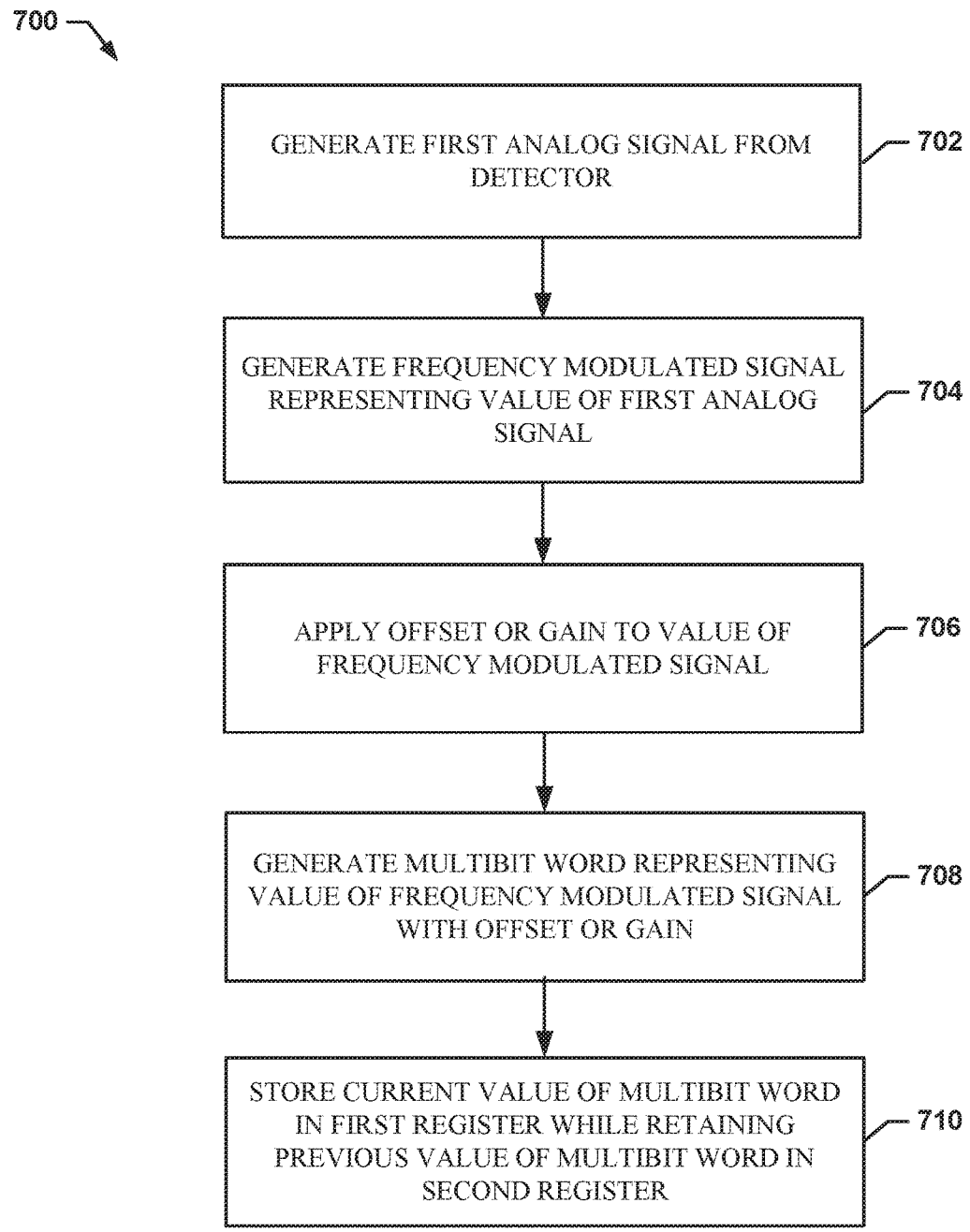
FIG. 7 is a flow diagram of an embodiment of a method for sensing in a CSA.

Various embodiments of the Computational Sensing Array 100 can be used to practice a method for sensing. FIG. 7 shows a flow diagram of one embodiment of a method 700 for sensing in a Computational Sensing Array. In some embodiments of a Computational Sensing Array, each sensing element or pixel unit of a plurality of sensing elements or pixel units in the Computational Sensing Array operates in accordance with the method 700.

In a block 702, a first analog signal is generated from a detector. For example, the detector may be a photodiode, a phototransistor or another type of sensor or transducer, and the first analog signal may include a voltage or a current. In a block 704, a frequency modulated signal representing the value of the first analog signal is generated. In one embodiment, the frequency modulated signal includes a series of pulses, and the pulse rate or frequency of the pulses is related to the amount of light impinging on the detector. In another embodiment, the frequency modulated signal is produced by a sigma delta modulator coupled to the detector.

In a block 706, an offset or a gain is applied to the value of the frequency modulated signal. In one embodiment, the value of the frequency modulated signal is determined by counting the pulses over a specified period of time, and the offset or the gain is applied to the count of the pulses. In another embodiment, the offset is applied by initializing an accumulator with a fixed point number. The gain may be applied by adding a fixed point number to the accumulated value in the accumulator in response to each pulse of the frequency modulated signal. In one embodiment, both offset and gain are applied.

In a block 708, a multibit word representing the value of the frequency modulated signal with the offset or the gain is generated. In one embodiment, the multibit word is generated by outputting the accumulated value from the accumulator. In another embodiment, the generation of the multibit word includes incrementing the accumulator with each pulse of the frequency modulated signal over the specified period of time. In a block 710, the current value of the multibit word is stored in a first register. The current value of the multibit word is stored while a previous value of the multibit word is retained in a second register. In one embodiment, the first and second registers are local to the sensing element or pixel unit.

Further embodiment of the implementation of the various functional blocks in state of the art CMOS technology using Near Threshold Voltage (NTV) digital circuits design methodology optimized for minimum energy operation.

Figure 8:
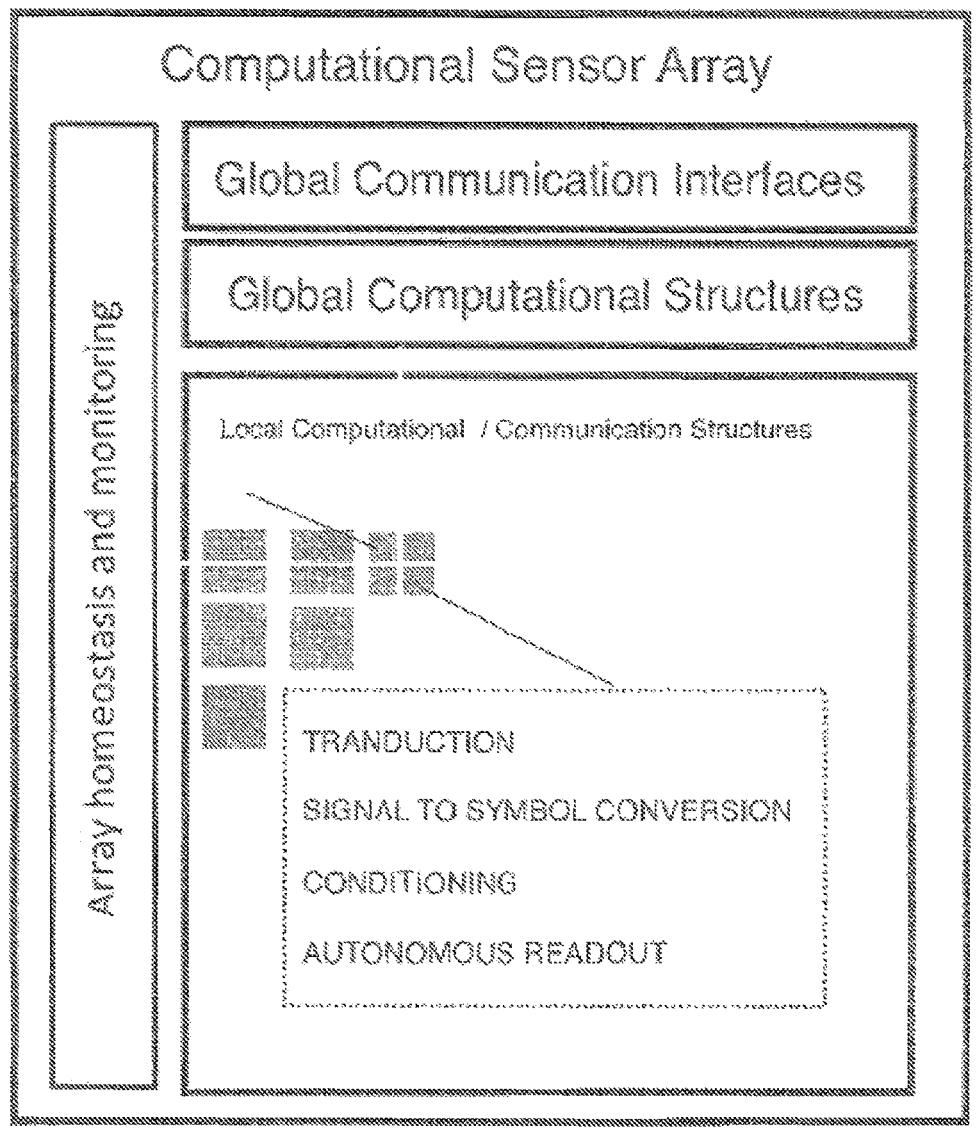
FIG. 8 is a block diagram of an embodiment of the Computational Sensing Array of FIG. 1, having a Homeostasis Processor Unit.

Further embodiments of the implementation of each individual computational/communication block in the Computational Sensor Array allow for operation at different power supplies ranging from 100 mV to the maximum voltage allowed by the implementation technology. The power supply of each block or combination of functional blocks is optimized for minimum energy or power-delay product operation. The overall monitoring of the functionality and optimization of power dissipation in the array is monitored by the Homeostasis Processor Unit (see FIG. 8).

Further embodiments of the implementation of the CSA involve special computational structures to compensate for component variability that is time-varying. This non-ergodic variability is always present in deep-submicron CMOS technologies. Special local and global computational structures may be incorporated to compensate for the variability which will manifest itself as time-varying spatial and time-varying temporal noise, such as random telegraph noise. The homeostasis processor unit is the supervisor for monitoring and scheduling the compensation of time-varying variability.

Further embodiments of the implementation of the CSA use CMOS three dimensional technologies (3D CMOS) where each tier of the 3D stack (see FIG. 1B) is fabricated in a different technology node that is optimum for the circuits implemented in that particular tier. For example one tier can be in 65 nm CMOS technology and optimized for discrete-time/discrete-value and digital circuits while another tier would be in the 130 nm CMOS node optimized for continuous-time/continuous-value and analog circuits.

One embodiment of a time varying compensation is to perform sub-cycle sampling of the signal to estimate a signal flux rate for that cycle and variance for the sub-cycle samples, store these estimates and compare to consecutive sub-cycle samples. The deviant sub-cycle samples are set to the estimated signal flux for that cycle and the relevance ranking is set accordingly. If a number of sub-cycle samples are determined to be deviant (i.e. exceeding low or high thresholds), the output register (i.e. counter) for the sensing element is set to a preset value and its relevance ranking set accordingly. The number of sub-cycle samples used in estimating the flux and variance, associated thresholds, and the number of allowable deviant sub-cycle samples, preset output, and ranking are programmable or automatically set values. This compensation can be employed alone or with other functions stated here.

Another embodiment of a time varying compensation is to replace bad or defective sensing elements (as determined by the relevance indexing) output or intermediate value with the mean or median of corresponding values of neighboring sensing elements. It should be noted and emphasized that this architecture can support frame (or image) based sensing (i.e. array sensing) or independent single element sensing that are grouped in an array. The term locally in this document refers to a group (sub-set) of neighborly (spatially and/or temporally) sensing elements; globally refers to all the operable (as determined by their relevance ranking) sensing elements With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computational sensing array comprising:
   an integrated circuit with an array of sensing elements, each sensing element including:
   a collection unit operable to be coupled to a transducer and configured to produce a discrete value, discrete time or continuous time signal based on activity of the transducer;
   a conditioning unit operable to receive the discrete value, discrete time or continuous time signal, and having an integrating state holding element configured to produce an adjusted value from the discrete value, discrete time or continuous time signal;
   a readout unit configured to output the adjusted value;
   a sensing element preprocessing unit coupled to the conditioning unit and configured to produce a value of the adjusted discrete value, discrete time or continuous time signal and to produce an indication of change with respect to the discrete value, discrete time or continuous time signal;
   an autonomous mechanism coupled to the sensing element preprocessing unit and configured to output a column address of a sensing element having a detected change, on a column by column basis, row by row basis, or element by element basis,
   wherein the adjusted value is adjusted for time variability or space variability.

2. The computational sensing array of claim 1, wherein:
   the collection unit includes a sigma delta modulator configured to produce a modulated, discrete-valued signal as the discrete value, discrete time or continuous time signal;
   the conditioning unit includes an offset state holding element configured to store an offset value; and
   the integrating state holding element is configured to:
   receive the offset value in response to a reset; and
   add an incremental value in response to each of a plurality of pulses from the sigma delta modulator.

3. The computational sensing array of claim 1, wherein:
   the collection unit includes a sigma delta modulator configured to produce a modulated, discrete-valued signal as the discrete value, discrete time or continuous time signal;
   the conditioning unit includes a gain state holding element configured to store a gain value; and
   the integrating state holding element is configured to add the gain value in response to each of a plurality of pulses from the sigma delta modulator.

4. The computational sensing array of claim 1, further comprising:
   a column integrating state holding element for each column of the array of sensing elements, configured to sum intensities of sensing elements in the column.

5. The computational sensing array of claim 1, wherein:
   the transducer includes a photodiode or a phototransistor.

6. The computational sensing array of claim 1, further comprising:
   a magnitude comparators module coupled to the sensing elements and configured to detect if any sensing elements in a currently selected row are within an acceptance interval.

7. The computational sensing array of claim 6, wherein:
   each sensing element includes at least a state holding element configured to store versions of the adjusted value from differing epochs; and
   the magnitude comparators module coupled to the sensing elements includes the magnitude comparators module being coupled to the at least a state holding element of each sensing element.

8. The computational sensing array of claim 6, wherein:
   the acceptance interval has a high threshold and a low threshold, programmable on a column by column basis.

9. The computational sensing array of claim 6, further comprising:
   a relevance encoder module coupled to the magnitude comparators module and configured to sort sensing elements by column;
   wherein the magnitude comparators module and the priority encoder module form at least a portion of an auto-scanning mechanism.

* * * * *